United States Patent
Sheng

(10) Patent No.: US 10,469,684 B2
(45) Date of Patent: Nov. 5, 2019

(54) ELECTRONIC DEVICE FOR ALIGNING ORIENTATIONS OF SCANNING IMAGES AND METHOD THEREOF

(71) Applicant: AVISION INC., Hsinchu (TW)

(72) Inventor: Shao-Lan Sheng, Hsinchu (TW)

(73) Assignee: AVISION INC., Hsinchu (TW)

( * ) Notice: Subject to any disclaimer, the term of this patent is extended or adjusted under 35 U.S.C. 154(b) by 0 days.

(21) Appl. No.: 16/205,159

(22) Filed: Nov. 29, 2018

(65) Prior Publication Data
US 2019/0297212 A1 Sep. 26, 2019

(30) Foreign Application Priority Data
Mar. 26, 2018 (TW) .............................. 107110229 A

(51) Int. Cl.
*H04N 1/00* (2006.01)
(52) U.S. Cl.
CPC ..... *H04N 1/00721* (2013.01); *H04N 1/00331* (2013.01); *H04N 1/00737* (2013.01); *H04N 1/00779* (2013.01)
(58) Field of Classification Search
CPC ........... H04N 1/00721; H04N 1/00737; H04N 1/00331; H04N 1/00779
USPC ....................................................... 358/1.14
See application file for complete search history.

(56) References Cited

U.S. PATENT DOCUMENTS

| 5,383,754 A | 1/1995 | Sumida |
| 2006/0033775 A1 | 2/2006 | Tsai |
| 2010/0260399 A1* | 10/2010 | Hajnal ................. G06F 19/321 382/131 |

FOREIGN PATENT DOCUMENTS

| CN | 1214592 A | 4/1999 |
| CN | 1605948 A | 4/2005 |
| CN | 101409762 A | 4/2009 |
| CN | 104780292 A | 7/2015 |
| CN | 104869267 A | 8/2015 |
| TW | I236838 | 7/2005 |

\* cited by examiner

*Primary Examiner* — Tammy Paige Goddard
*Assistant Examiner* — Darryl V Dottin
(74) *Attorney, Agent, or Firm* — Winston Hsu

(57) ABSTRACT

An electronic device for aligning orientations of scanning images includes a scanning module, a storage module, an identification module, a timing unit, an alignment module, and a control unit. The control unit controls the scanning module to scan N scanned objects at different times and to store N scanning images corresponding to the N scanned objects into the storage module. The control unit controls the identification module to identify orientations of the N scanning images. The control unit controls the timing unit to calculate time intervals among the N scanning images. The control unit determines whether to control the alignment module to align orientations of a second scanning image to an Nth scanning image of the N scanning images with orientation of a first scanning image of the N scanning images according to the time intervals among the N scanning images calculated by the timing unit.

8 Claims, 10 Drawing Sheets

ELECTRONIC DEVICE FOR ALIGNING ORIENTATIONS OF SCANNING IMAGES AND METHOD THEREOF

BACKGROUND OF THE DISCLOSURE

1. Field of the Disclosure

The present disclosure relates to an electronic device for aligning orientations of scanning images and a method thereof, and more particularly, to an electronic device for aligning orientations of scanning images other than a first scanning image according to time intervals among the first scanning image and the scanning images and an orientation of the first scanning image, and a method thereof.

2. Description of the Prior Art

With advance of the scanning technology, scanners are widely used in families or offices. The scanners can capture images of physical objects, such as documents, photographs and books. The digital images can be displayed and stored in computer devices. The digital images of the physical objects can be stored permanently. Therefore, it is not required to store the physical objects anymore, which can save space occupied by the physical objects. Furthermore, it also allows a user to edit or transfer the images easily. Therefore, the scanners have an extensive range of applications.

The scanners can be usually divided into two categories: flatbed scanners and sheet-fed scanners depending on different using modes. The sheet-fed scanner can feed paper automatically. Therefore it is suitable for scanning a large number of single-page documents. However, when some of the single-page documents are unintentionally misplaced in an improper orientation, scanning images or printed pages of the documents have different orientations.

On the other hand, the flatbed scanner is suitable for scanning bound documents or books. The bound document or the book cannot be fed by an automatic document feeder of the sheet-fed scanner if the bound document or the book is not torn apart. However, when it is desired to use the flatbed scanner to scan the book, the open book cannot be flattened, and a portion of a scanned page near a binder of the book cannot be closely attached onto a scanning platform of the flatbed scanner. Therefore, a scanning image of the scanned page may be unclear or has a dark portion. Although there is another flatbed scanner with a slope to allow the binder of the book to rest thereon for flattening the book to generate a clear scanning image. However, the book has to be rotated by 180 degrees when scanning odd and even pages of the book. Therefore, scanning images of the odd and even pages have different orientations, which is not convenient in use.

SUMMARY OF THE DISCLOSURE

Therefore, it is an objective of the present disclosure to disclose an electronic device for aligning orientations of scanning images other than a first scanning image according to time intervals among the first scanning image and the scanning images and an orientation of the first scanning image, and a method thereof for solving the aforementioned problems.

To achieve the aforementioned objective, the present disclosure discloses an electronic device for aligning orientations of scanning images. The electronic device includes a scanning module, a storage module, an identification module, a timing unit, an alignment module and a control unit. The scanning module is for scanning N scanned objects to generate N scanning images. The storage module is for storing the N scanning images generated by the scanning module. The identification module is for identifying orientations of the N scanning images stored in the storage module. The timing unit is for calculating N time intervals among the N scanning images generated by the scanning module. The alignment module is for aligning the orientations of the N scanning images stored in the storage module. The control unit is electrically connected to the scanning module, the storage module, the identification module, the timing unit and the alignment module. The control unit controls the scanning module to scan the N scanned objects at different times and to store the N scanning images corresponding to the N scanned objects into the storage module. The control unit further controls the identification module to identify the orientations of the N scanning images, and the control unit further determines whether to control the alignment module to align orientations of a second scanning image to an Nth scanning image of the N scanning images with an orientation of a first scanning image of the N scanning images according to the N time intervals among the N scanning images calculated by the timing unit.

According to an embodiment of the present disclosure, the control unit does not control the alignment module to align an orientation of an Mth scanning image of the N scanning images with the orientation of the first scanning image of the N scanning images when the control unit determines an (M−1)th time interval of the N time intervals between the Mth scanning image and an (M−1)th scanning image is greater than a predetermined time interval.

According to an embodiment of the present disclosure, when the control unit determines an Mth time interval of the N time intervals between an (M+1)th scanning image and the Mth scanning image of the N scanning images is less than the predetermined time interval, the control unit controls the alignment module to align an orientation of the (M+1)th scanning image with the orientation of the Mth scanning image, so that the orientation of the (M+1)th scanning image of the Nth scanning images is the same as the orientation of the Mth scanning image of the Nth scanning images.

According to an embodiment of the present disclosure, when the control unit determines each time interval between two continuous scanning images of the first scanning image to an Mth scanning image of the N scanning images is less than a predetermined time interval, the control unit controls the alignment module to align the orientations of the second scanning image to the Mth scanning image with the orientation of the first scanning image, so that the orientations of the second scanning image to the Mth scanning image of the Nth scanning images are the same as the orientation of the first scanning image of the Nth scanning images.

According to an embodiment of the present disclosure, the electronic device further includes a printing module electrically connected to the control unit and for printing the N scanning images after alignment.

According to an embodiment of the present disclosure, the identification module identifies the orientations of the N scanning images stored in the storage module by optical character recognition.

To achieve the aforementioned objective, the present disclosure further discloses a method of aligning orientations of scanning images with an electronic device. The method includes a control unit of the electronic device controlling a scanning module of the electronic device to scan N scanned objects at different times to generate N scanning images and further storing the N scanning images corresponding to the N scanned objects into a storage module; the control unit controlling an identification module of the electronic device to identify orientations of the N scanning images stored in the storage module; the control unit controlling a timing unit to calculate N time intervals among the N scanning images; and the control unit determining whether to control an alignment module of the electronic device to align orientations of a second scanning image to an Nth scanning image of the N scanning images with an orientation of a first scanning image of the N scanning images according to the N time intervals among the N scanning images calculated by the timing unit.

According to an embodiment of the present disclosure, the control unit determining whether to control the alignment module of the electronic device to align the orientations of the second scanning image to the Nth scanning image of the N scanning images with the orientation of the first scanning image of the N scanning images according to the N time intervals among the N scanning images calculated by the timing unit includes the control unit not controlling the alignment module to align an orientation of an Mth scanning image of the N scanning images with the orientation of the first scanning image of the N scanning images when the control unit determines an (M−1)th time interval of the N time intervals between an Mth scanning image and an (M−1)th scanning image of the N scanning images is greater than a predetermined time interval.

According to an embodiment of the present disclosure, the control unit determining whether to control the alignment module of the electronic device to align the orientations of the second scanning image to the Nth scanning image of the N scanning images with the orientation of the first scanning image of the N scanning images according to the N time intervals among the N scanning images calculated by the timing unit includes when the control unit determines an Mth time interval of the N time intervals between an (M+1)th scanning image and the Mth scanning image of the N scanning images is less than the predetermined time interval, the control unit controlling the alignment module to align an orientation of the (M+1)th scanning image with the orientation of the Mth scanning image, so that the orientation of the (M+1)th scanning image of the Nth scanning images is the same as the orientation of the Mth scanning image of the Nth scanning images.

According to an embodiment of the present disclosure, the control unit determining whether to control the alignment module of the electronic device to align the orientations of the second scanning image to the Nth scanning image of the N scanning images with the orientation of the first scanning image of the N scanning images according to the N time intervals among the N scanning images calculated by the timing unit includes when the control unit determines each time interval between two continuous scanning images of the first scanning image to an Mth scanning image of the N scanning images is less than a predetermined time interval, the control unit controlling the alignment module to align the orientations of the second scanning image to the Mth scanning image with the orientation of the first scanning image, so that the orientations of the second scanning image to the Mth scanning image of the Nth scanning images are the same as the orientation of the first scanning image of the Nth scanning images.

According to an embodiment of the present disclosure, the method further includes the control unit controlling a printing module of the electronic device to print the N scanning images after alignment.

According to an embodiment of the present disclosure, the control unit controlling the identification module to identify the orientations of the N scanning images stored in the storage module includes the control unit controlling the identification module to identify the orientations of the N scanning images stored in the storage module by optical character recognition.

In summary, in the preset disclosure, when the control unit determines each time interval between two continuous scanning images of the first scanning image to the Mth scanning image of the N scanning images is less than the predetermined time interval, the control unit can judge that the first scanning images to the Mth scanning image belong to the same scanning task, e.g., a first scanning task, and control the alignment module to align the orientations of the second scanning image to the Mth scanning image with the orientation of the first scanning image, so that the orientations of the second scanning image to the Mth scanning image of the Nth scanning images are the same as the orientation of the first scanning image of the Nth scanning images. Furthermore, when the control unit determines the (M−1)th time interval of the N time intervals between the Mth scanning image and the (M−1)th scanning image of the N scanning images is greater than the predetermined time interval, the control unit considers the Mth scanning image of the N scanning images is an initial scanning image of another new scanning task, e.g., a second scanning task, and does not control the alignment module to align the orientation of the Mth scanning image of the N scanning images with the orientation of the first scanning image of the N scanning images. Besides, when the control unit determines the Mth time interval of the N time intervals between the (M+1)th scanning image and the Mth scanning image of the N scanning images is less than the predetermined time interval, the control unit can judge that the Mth scanning image and the (M+1)th scanning image of the N scanning images belong to the same scanning task, e.g., the second scanning task, and control the alignment module to align the orientation of the (M+1)th scanning image of the N scanning images with the orientation of the Mth scanning image of the N scanning images, so that the orientation of the (M+1)th scanning image of the Nth scanning images is the same as the orientation of the Mth scanning image of the Nth scanning images. M can be greater than 1 and not greater than N. In such a way, the scanning images of the same scanning task can have the same orientation. Therefore, it is not required for a user to manually rotate the misaligned the scanning images anymore, which is convenient in use.

These and other objectives of the present disclosure will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. Accordingly, the drawings and descriptions will be regarded as illustrative in nature and not as restrictive.

Figure 1:
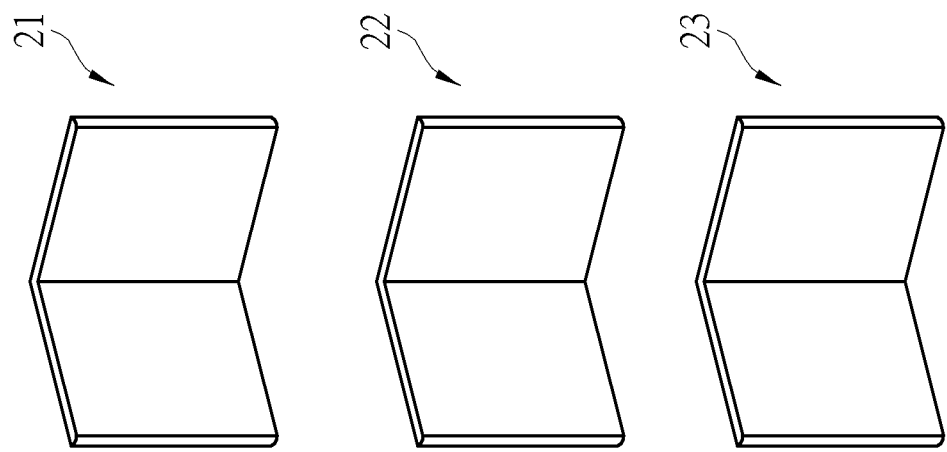
FIG. 1 is a scanning diagram of an electronic device according to a first embodiment of the present disclosure.
Figure 1:
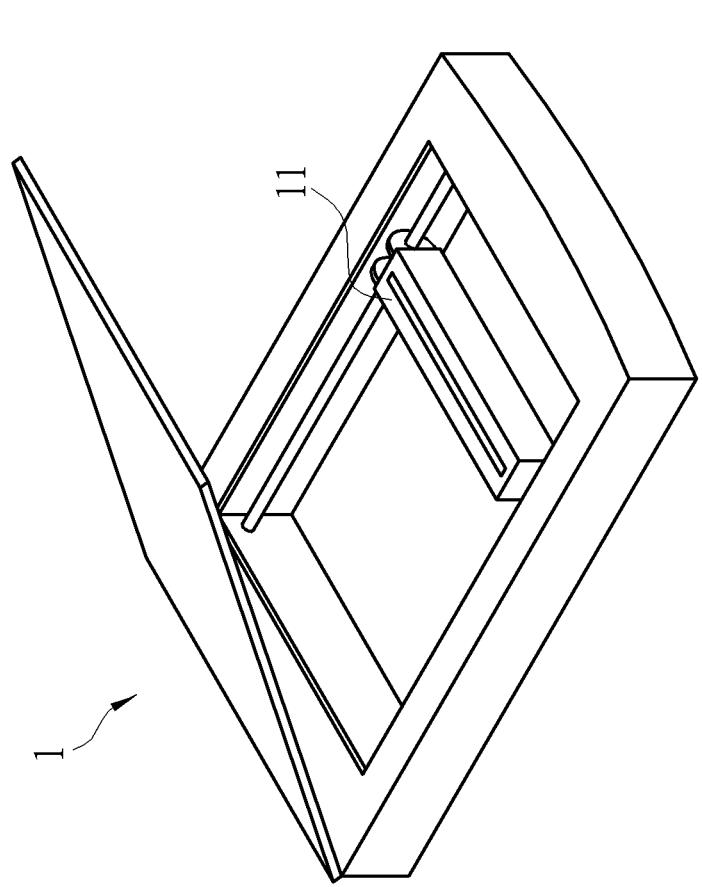
Figure 2:
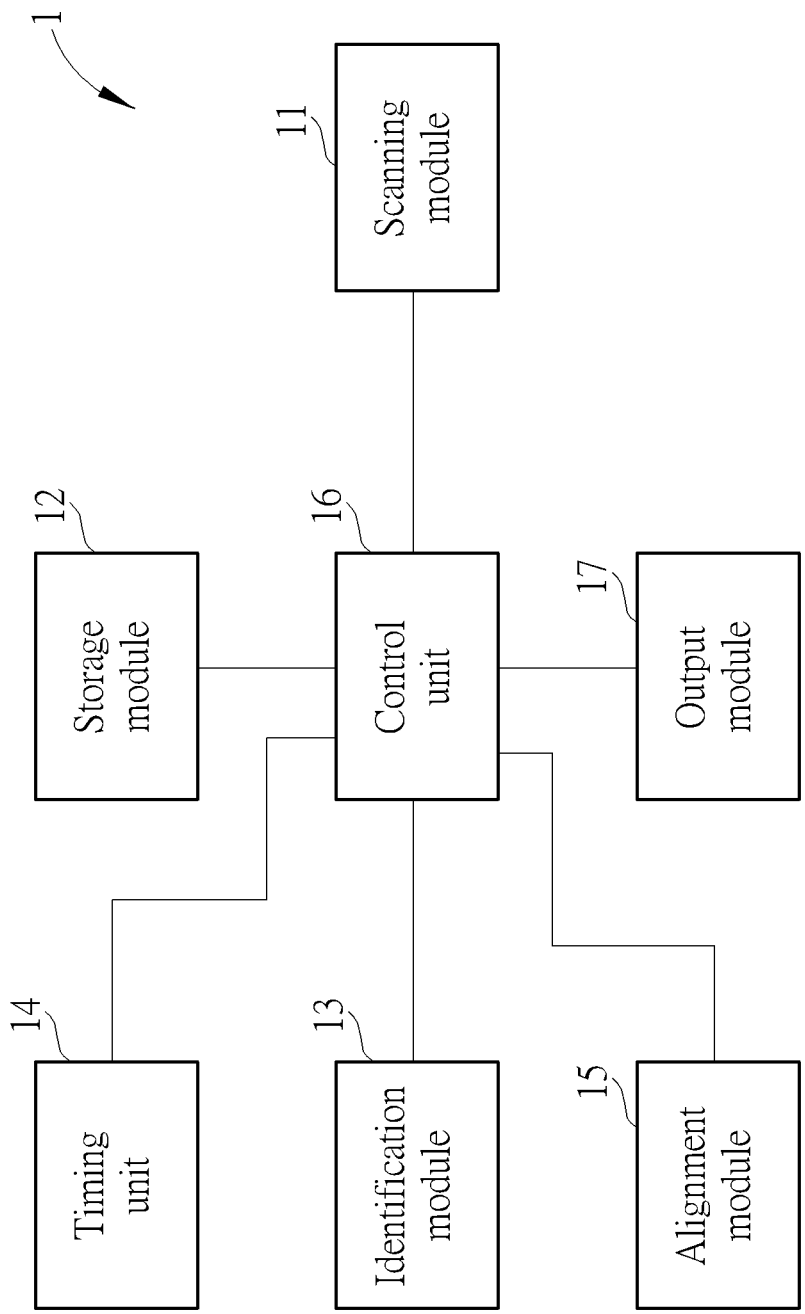
FIG. 2 is a functional block diagram of the electronic device according to the first embodiment of the present disclosure.

Please refer to FIG. 1 to FIG. 2. FIG. 1 is a scanning diagram of an electronic device 1 according to a first embodiment of the present disclosure. FIG. 2 is a functional block diagram of the electronic device 1 according to the first embodiment of the present disclosure. As shown in FIG. 1 and FIG. 2, in this embodiment, the electronic device 1 can be a scanner and for aligning orientations of scanning images thereof. The electronic device 1 includes a scanning module 11, a storage module 12, an identification module 13, a timing unit 14, an alignment module 15 and a control unit 16. The scanning module 11 is for scanning scanned objects to generate scanning images corresponding to the scanned objects. The storage module 12 is for storing the scanning images generated by the scanning module 14. The identification module 13 is for identifying orientations of the scanning images stored in the storage module 12. The timing unit 14 is for calculating time intervals among the scanning images generated by the scanning module 11. The alignment module 15 is for aligning the orientations of the scanning images stored in the storage module 12. The control unit 16 is electrically connected to the scanning module 11, the storage module 12, the identification module 13, the timing unit 14 and the alignment module 15 for controlling the aforementioned components. The control unit 16 can control the alignment module 15 to align the orientations of the scanning images according to the time intervals among the scanning images and the orientations of the scanning images identified by the identification module 13. Furthermore, the electronic device 1 can further include an output module 17 electrically connected to the control unit 16. The output module 17 can be coupled to an external device, such as a computer device, for outputting the aligned scanning images to the external device. In this embodiment, the scanning module 11 can be a charge coupled device (CCD), a contact image sensor (CIS) or any other optical component. The storage module 12 can be a memory, a hard disk drive or any other storage medium. The control unit 16 can be a microprocessor, a micro control unit (MCU), a digital signal processor (DSP) or any other processing component. The timing unit 14 can be a timer. The output module 17 can be a Bluetooth transmitter, a universal serial bus (USB) connector or any other transmission interface.

Figure 3:
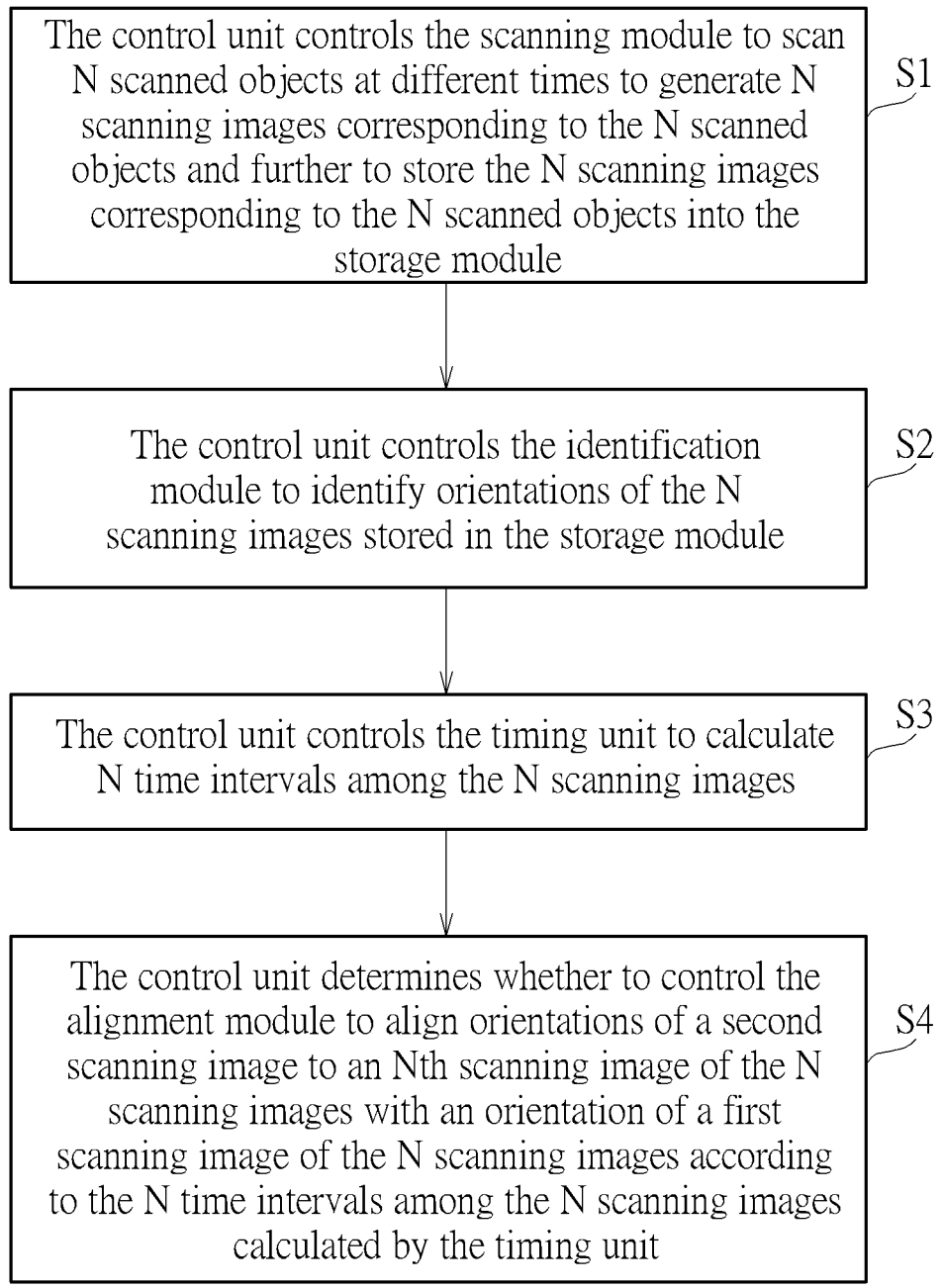
FIG. 3 is a flow chart diagram illustrating a method of aligning orientations of scanning images with the electronic device according to the first embodiment of the present disclosure.

Please refer to FIG. 3. FIG. 3 is a flow chart diagram illustrating a method of aligning the orientations of the scanning images with the electronic device 1 according to the first embodiment of the present disclosure. As shown in FIG. 3, the method includes the following steps:

S1: The control unit 16 controls the scanning module 11 to scan N scanned objects at different times to generate N scanning images corresponding to the N scanned objects and further to store the N scanning images corresponding to the N scanned objects into the storage module 12;

S2: The control unit 16 controls the identification module to identify orientations of the N scanning images stored in the storage module 12;

S3: The control unit 16 controls the timing unit 14 to calculate N time intervals among the N scanning images;

S4: The control unit 16 determines whether to control the alignment module 15 to align orientations of a second scanning image to an Nth scanning image of the N scanning images with an orientation of a first scanning image of the N scanning images according to the N time intervals among the N scanning images calculated by the timing unit 14.

Figure 4:
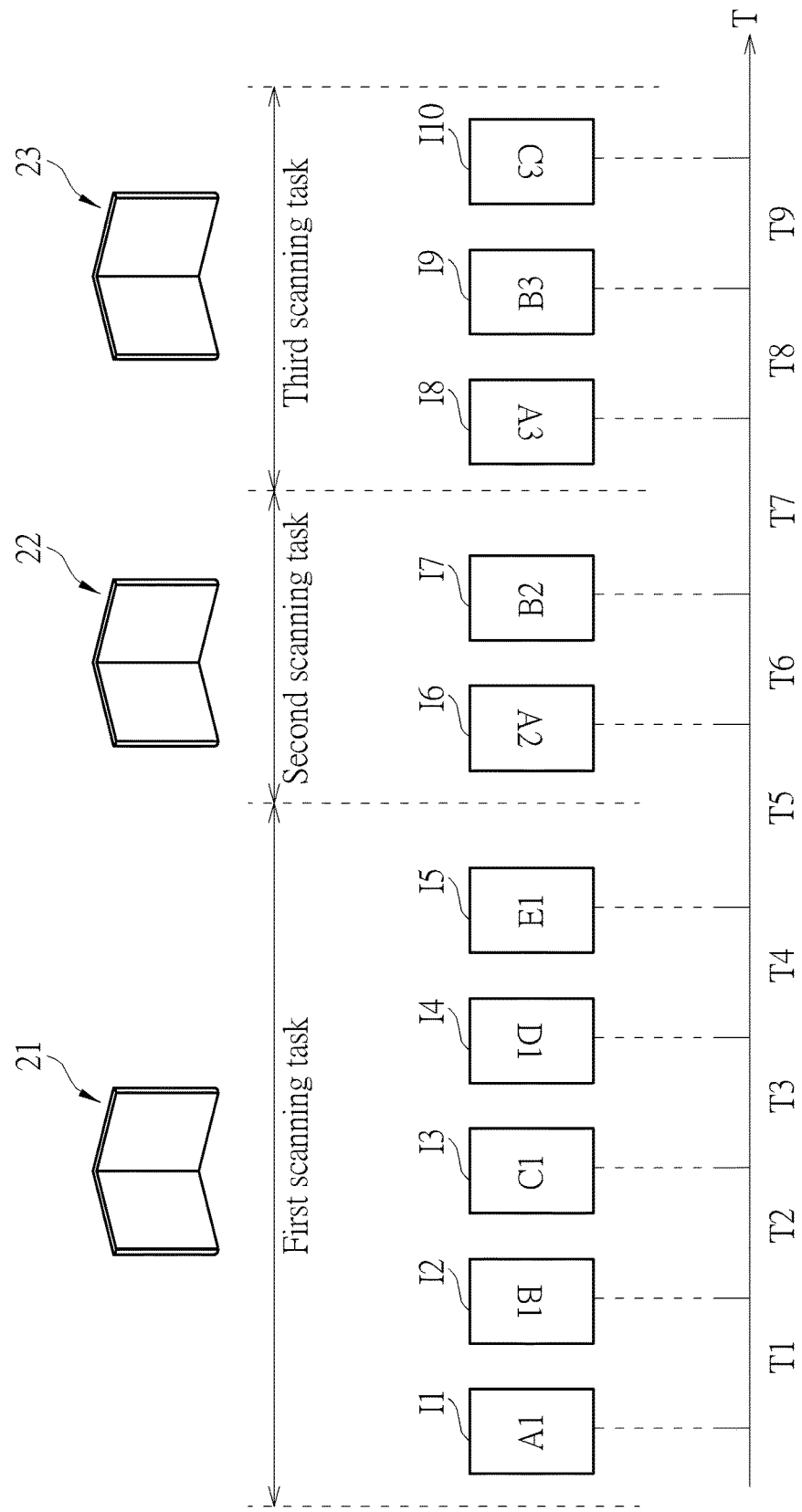
FIG. 4 is a diagram illustrating the scanning images of the electronic device before alignment according to the first embodiment of the present disclosure.
Figure 5:
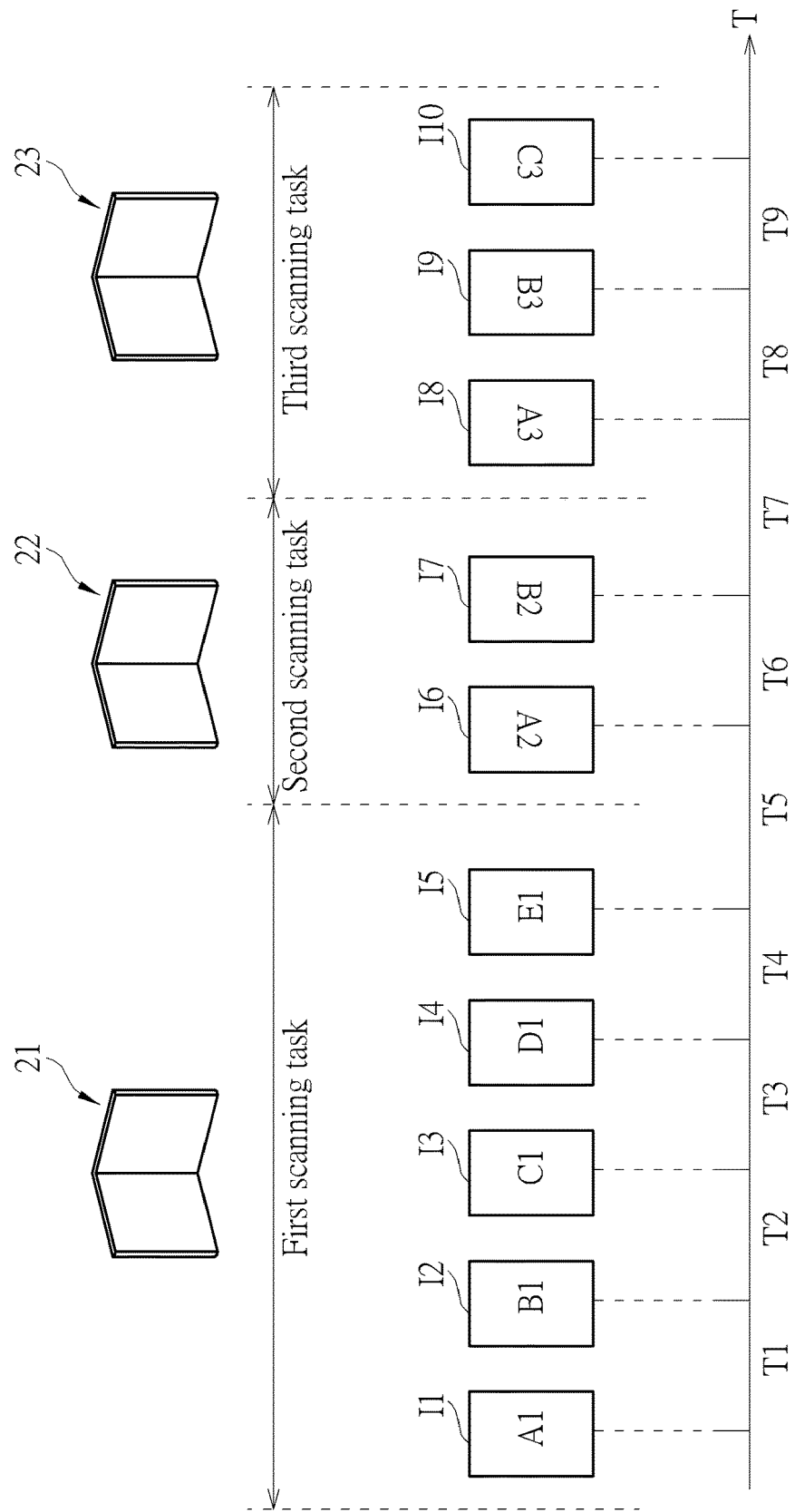
FIG. 5 is a diagram illustrating the scanning images of the electronic device after the alignment according to the first embodiment of the present disclosure.

More detailed description for the steps of the method is provided as follows. Please refer to FIG. 3 to FIG. 5. FIG. 4 is a diagram illustrating the scanning images of the electronic device 1 before alignment according to the first embodiment of the present disclosure. FIG. 5 is a diagram illustrating the scanning images of the electronic device 1 after the alignment according to the first embodiment of the present disclosure. For example, as shown in FIG. 4, the control unit 16 can control the scanning module 11 to scan ten scanned objects at different times to generate ten scanning images I1~I10 and further to store the ten scanning images I1~I10 corresponding to the ten scanned objects into the storage module 12 (step 1). In this embodiment, a first scanned object to a fifth scanned object of the ten scanned objects can be five pages of a first book 21. A sixth scanned object and a seventh scanned object of the ten scanned objects can be two pages of a second book 22. An eighth scanned object to a tenth scanned object of the ten scanned objects can be three pages of a third book 23. Afterwards, the control unit 16 can control the identification module 13 to identify orientations of the ten scanning images I1~I10 stored in the storage module 12 and further control the timing unit 14 to calculate time intervals T1~T9 among the ten scanning images I1~I10 generated by the scanning module 11 (steps S2 and S3). However, sequential order of the steps S2 and S3 is not limited to this embodiment. The electronic device 1 can execute step S2 before or after step S3, or even execute steps S2 and S3 at the same time.

Furthermore, the identification module 13 can identify orientations of characters, numbers or graphics on the ten scanning images I1~I10 stored in the storage module 12 by optical character recognition to identify the orientations of the ten scanning images I1~I10. For example, the identification module 13 can identify an orientation of a page number on an edge of a scanning image to identify an orientation of the scanning image. Besides, after the control unit 16 controls the timing unit 14 to calculate the time intervals T1~T9 among the ten scanning images I1~I10, the control unit 16 can determine whether to control the alignment module 15 to align orientations of a second scanning image I2 to an tenth scanning image I10 of the ten scanning images I1~I10 with an orientation of a first scanning image I1 of the ten scanning images I1~I10 according to the time intervals T1~T9 among the ten scanning images I1~I10 calculated by the timing unit 14 (step S4).

It should be noticed that during a scanning process, it takes more time to change a scanned book, and therefore, an time interval T5 between a fifth scanning image I5 and a sixth scanning image I6 of the ten scanning images I1~I10 and an time interval T7 between a seventh scanning image I7 and a eighth scanning image I8 of the ten scanning images I1~I10 are greater than other time intervals T1~T4, T6 and T8~T9. In other words, when the control unit 16 determines each of the time intervals T1~T4 among the first scanning image I1 to the fifth scanning image I5 is less than a predetermined time interval, the control unit 16 can judge that the first scanning image I1 to the fifth scanning image I5 of the ten scanning image I1~I10 belong to a first scanning task corresponding to the first book 21. At this moment, the control unit 16 controls the alignment module 15 to align the orientations of the second scanning image I2 to the fifth scanning image I5 of the ten scanning images I1~I10 with the orientation of the first scanning image I1 of the ten scanning images I1~I10, so that the orientations of the second scanning image I2 to the fifth scanning image I5 of the ten scanning images I1~I10 are the same as the orientation of the first scanning image I1 of the ten scanning images I1~I10, which makes it easy to read. Moreover, the aligned scanning images aligned by the alignment module 15 can be stored in the storage module 12 as an image file format or outputted to the external device via the output module 17.

When the control unit 16 determines the time interval T5 between the fifth scanning image I5 and the sixth scanning image I6 of the ten scanning images I1~I10 is greater than the predetermined time interval, the control unit 16 can judge that the sixth scanning image I6 of the ten scanning images I1~I10 belongs to a second scanning task corresponding to the second book 22 different from the first scanning task which the first scanning image I1 to the fifth scanning image I5 of the ten scanning images I1~I10 belong to. At this moment, the control unit 16 does not control the alignment module 15 to align an orientation of the sixth scanning image I6 of the ten scanning images I1~I10 with the orientation of the first scanning image I1 of the ten scanning images I1~I10 because the sixth scanning image I6 and the first scanning image I1 belong to different scanning tasks. Afterwards, when the control unit 16 determines a time interval T6 between the sixth scanning image I6 and the seventh scanning image I7 of the ten scanning images I1~I10 is less than the predetermined time interval, the control unit 16 can judge that the seventh scanning image I7 and the sixth scanning image I6 of the ten scanning images I1~I10 belong to the same second scanning task corresponding to the second book 22. At this moment, the control unit 16 controls the alignment module 15 to align an orientation of the seventh scanning image I7 of the ten scanning images I1~I10 with the orientation of the sixth scanning image I6 of the ten scanning images I1~I10, so that the orientation of the seventh scanning image I7 of the ten scanning images I1~I10 is the same as the orientation of the sixth scanning image I6 of the ten scanning images I1~I10, which makes it easy to read.

When the control unit 16 determines a time interval T7 between the seventh scanning image I7 and the eighth scanning image I8 of the ten scanning images I1~I10 is greater than the predetermined time interval, the control unit 16 can judge that the eighth scanning image I8 belongs to a third scanning task corresponding to the third book 23 different from the second scanning task which the sixth scanning image I6 and the seventh scanning image I7 of the ten scanning images I1~I10 belong to. At this moment, the control unit 16 does not control the alignment module 15 to align an orientation of the eighth scanning image I8 of the ten scanning images I1~I10 with the orientation of the first scanning image I1 or the sixth scanning image I6 of the ten scanning images I1~I10 because the eighth scanning image I8 and the first scanning image I1/the sixth scanning image I6 belong to different scanning tasks. When the control unit 16 determines each of time intervals T8, T9 among the eighth scanning image I8 to the tenth scanning image I10 of the ten scanning images I1~I10 is less than the predetermined time interval, the control unit 16 can consider the eighth scanning image I8 to the tenth scanning image I10 belong to the same third scanning task corresponding to the third book 23. Simultaneously, the control unit 16 controls the alignment module 15 to align orientations of the ninth scanning image I9 to the tenth scanning image I10 of the ten scanning images I1~I10 with the orientation of the eighth scanning image I8 of the ten scanning images I1~I10, so that the orientations of the ninth scanning image I9 to the tenth scanning image I10 of the ten scanning images I1~I10 are the same as the orientation of the eighth scanning image I8 of the ten scanning images I1~I10, which makes it easy to read.

In this embodiment, the present disclosure can divide the ten scanning images I1~I10 into three different scanning tasks, i.e., the first scanning task, the second scanning task and the third scanning task, according to the time intervals T1~T9 among the ten scanning images I1~I10 and align the orientations of the scanning images to make the scanning images of the same scanning task have the same orientation, which makes it easy to read.

Figure 6:
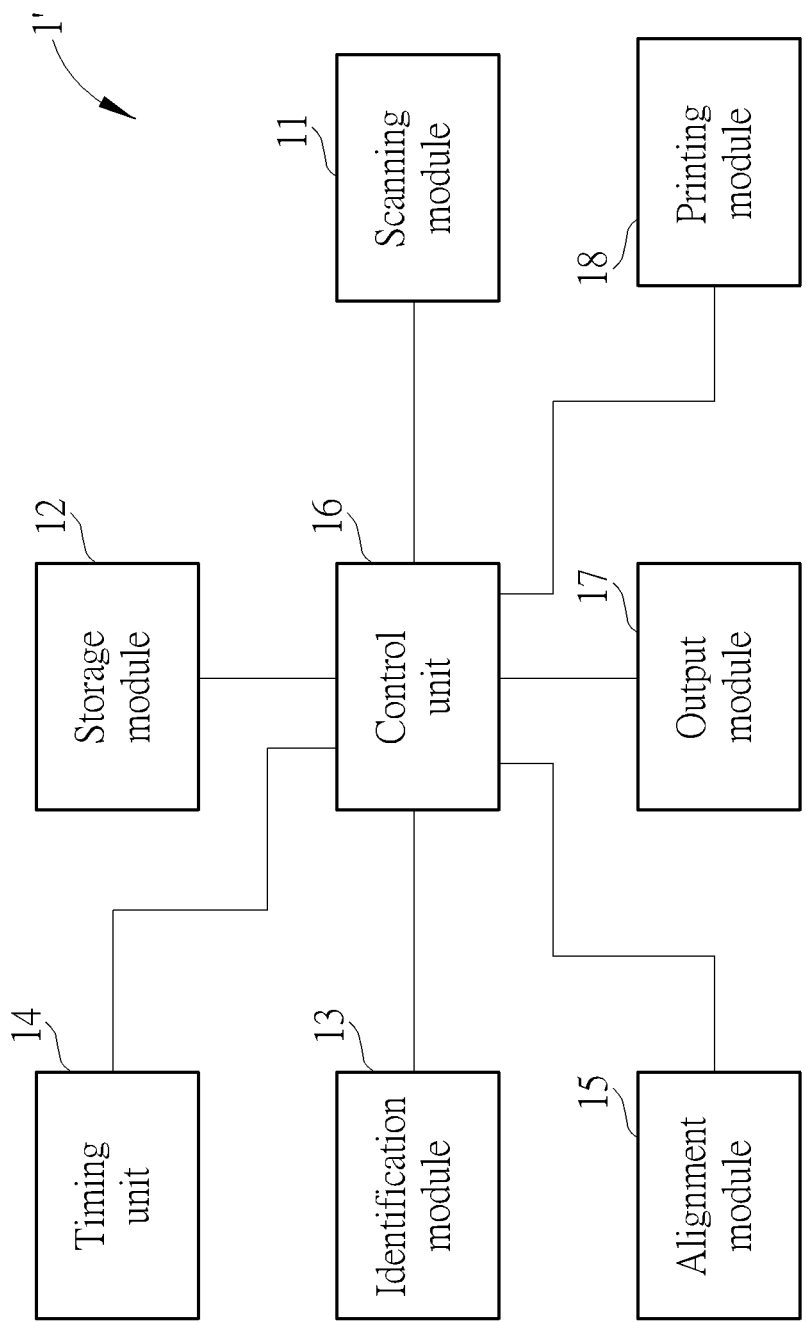
FIG. 6 is a functional block diagram of an electronic device according to a second embodiment of the present disclosure.
Figure 7:
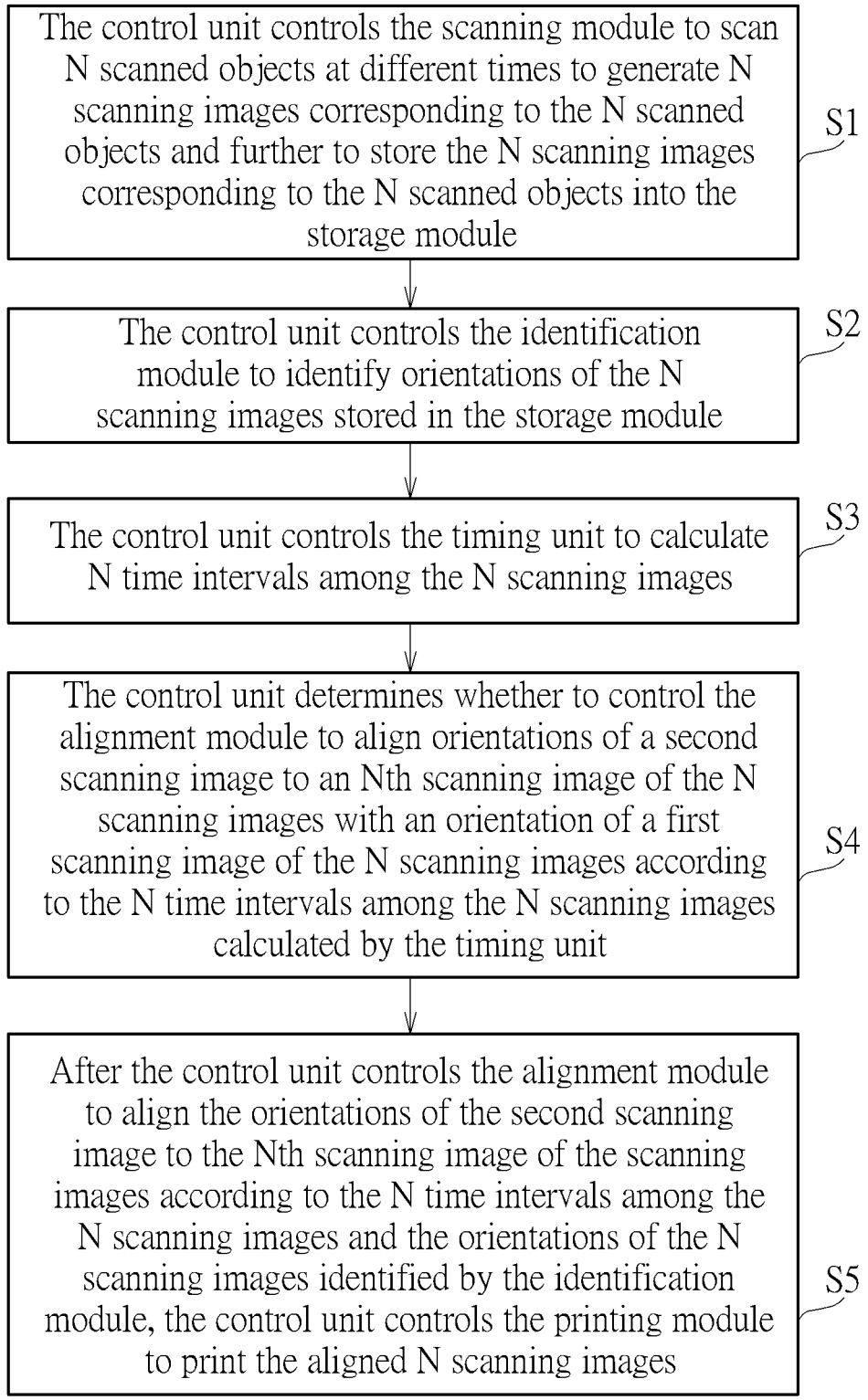
FIG. 7 is a flow chart diagram illustrating a method of aligning orientations of scanning images and printing the scanning images with the electronic device according to the second embodiment of the present disclosure.

Furthermore, the electronic device 1 of the present disclosure is not limited to the aforementioned embodiment. Please refer to FIG. 6 and FIG. 7. FIG. 6 is a functional block diagram of an electronic device 1' according to a second embodiment of the present disclosure. FIG. 7 is a flow chart diagram illustrating a method of aligning orientations of scanning images and printing the scanning images with the electronic device 1' according to the second embodiment of the present disclosure. As shown in FIG. 6 and FIG. 7, different from the first embodiment, the electronic device 1' can be a copying device, i.e., the electronic device 1' can further includes a printing module electrically connected to the control unit 16. Operational principles of the other components of this embodiment are similar to the ones of the first embodiment. Detailed description is omitted herein for simplicity. In this embodiment, after the control unit 16 controls the alignment module 15 to align the orientations of the second scanning image I2 to the tenth scanning image I10 of the ten scanning images I1~I10 according to the time intervals T1~T9 among the ten scanning images I1~I10 and the orientations of the ten scanning images I1~I10 identified by the identification module 13, the control unit 16 controls the printing module 17 to print the aligned ten scanning images I1~I10 (step S5).

Figure 8:
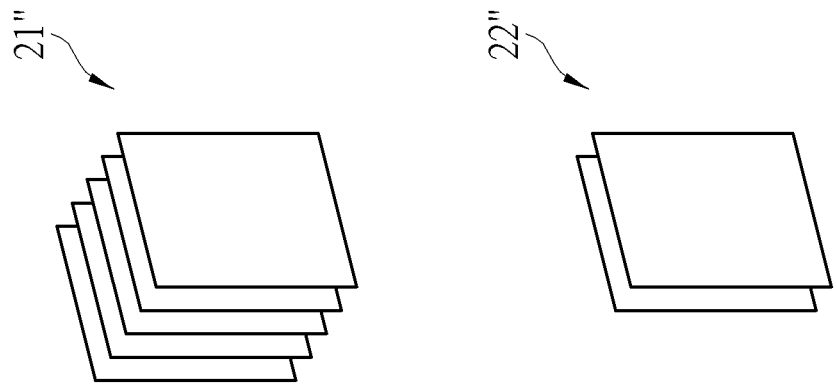
FIG. 8 is a scanning diagram of an electronic device according to a third embodiment of the present disclosure.
Figure 8:
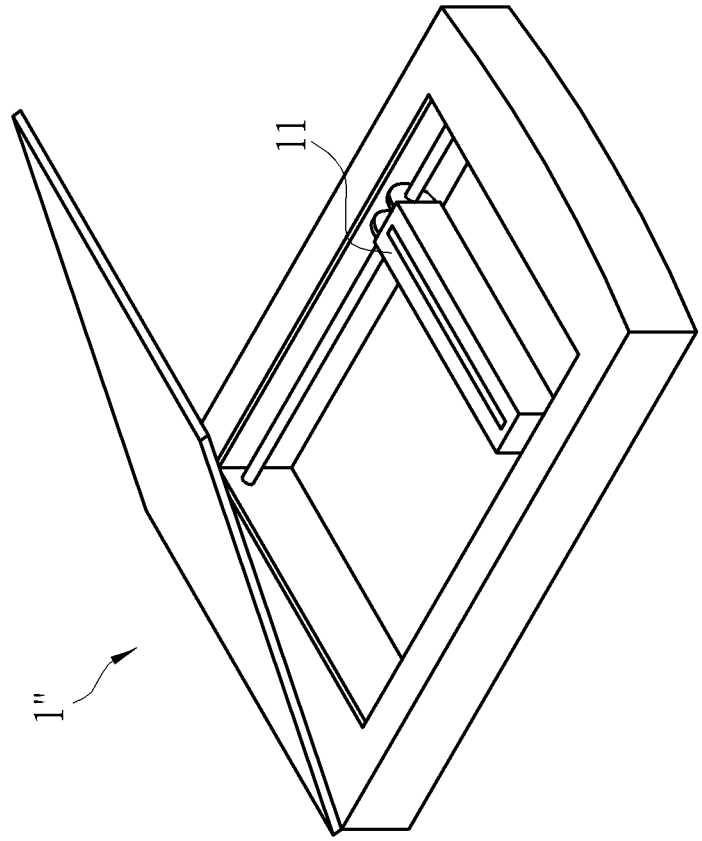
Figure 9:
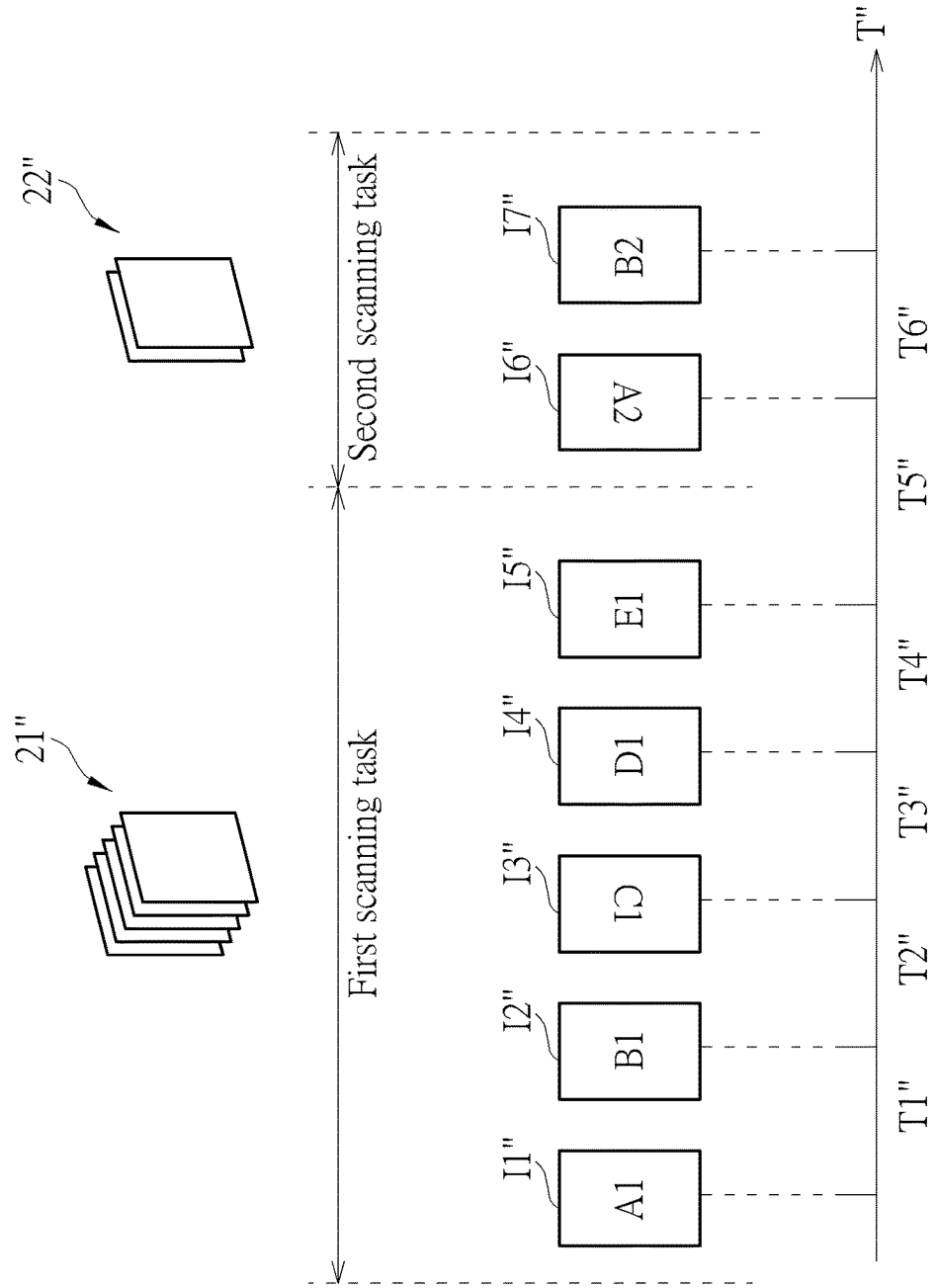
FIG. 9 is a diagram illustrating the scanning images of the electronic device before alignment according to the third embodiment of the present disclosure.
Figure 10:
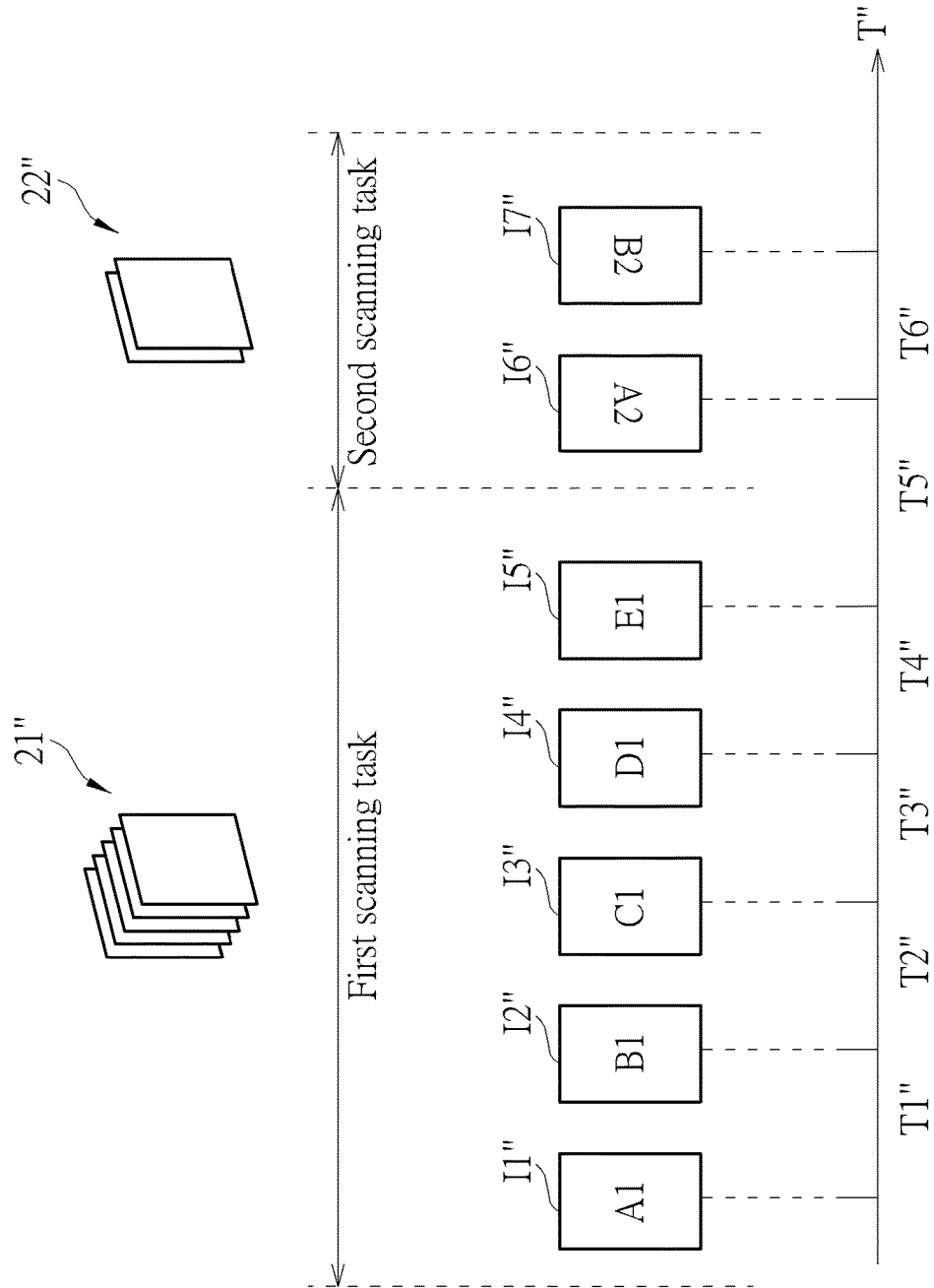
FIG. 10 is a diagram illustrating the scanning images of the electronic device after the alignment according to the third embodiment of the present disclosure.

Please refer to FIG. 8 to FIG. 10. FIG. 8 is a scanning diagram of an electronic device 1" according to a third embodiment of the present disclosure. FIG. 9 is a diagram illustrating the scanning images of the electronic device 1" before alignment according to the third embodiment of the present disclosure. FIG. 10 is a diagram illustrating the scanning images of the electronic device 1" after the alignment according to the third embodiment of the present disclosure. As shown in FIG. 8, the electronic device 1" of this embodiment includes the same components as the components included in the electronic device 1 of the first embodiment. Detailed description of structure and operational principle of the components of the electronic device 1" is omitted herein for simplicity. In this embodiment, the electronic device 1" also can be a scanner for scanning a first document 21" including five pages and a second document 22" including two pages. Referring to FIG. 8 to FIG. 10, since it's time-wasting to change a scanned document, a time interval T5" between a fifth scanning image I5" and a sixth scanning image I6" of seven scanning images I1"~I7" is greater than other time intervals T1"~T4", T6". In other words, when the control unit 16 determines time intervals T1"~T4" among a first scanning image I1" to the fifth scanning image I5" of the seven scanning images I1"~I7" are less than the predetermined time interval, the control unit 16 can judge that the first scanning image I1" to the fifth scanning image I5" of the seven scanning images I1"~I7" belong to a first scanning task corresponding to the first document 21". At this moment, the control unit 16 controls the alignment module 15 to align orientations of a second scanning image I2" to the fifth scanning image I5" of the seven scanning images I1"~I7" with the orientation of the first scanning image I1" of the seven scanning images I1"~I7", so that the orientations of the second scanning image I2" to the fifth scanning image I5" of the seven scanning images I1"~I7" are the same as the orientation of the first scanning image I1" of the seven scanning images I1"~I7", which makes it easy to read. When the control unit 16 determines the time interval T5" between the fifth scanning image I5" and the sixth scanning image I6" of the seven scanning images I1"~I7" is greater than the predetermined time interval, the control 16 can judge that the sixth scanning image I6" of the seven scanning images I1"~I7" belongs to a second scanning task corresponding to the second document 22" different from the first scanning task which the first scanning image I1" to the fifth scanning image I5" of the seven scanning images I1"~I7" belong to. At this moment, the control unit 16 does not control the alignment module 15 to align an orientation of the sixth scanning image I6" of the seven scanning images I1"~I7" with the orientation of the first scanning image I1" of the seven scanning images I1"~I7". When the control unit 16 determines a time interval T6" between the sixth scanning image I6" and a seventh scanning image I7" of the seven scanning images I1"~I7" is less than the predetermined time interval, the control unit 16 can judge that the seventh scanning image I7" and the sixth scanning image I6" of the seven scanning images I1"~I7" belong to the same second scanning task corresponding to the second document 22". At this moment, the control unit 16 controls the alignment module 15 to align an orientation of the seventh scanning image I7" of the seven scanning images I1"~I7" with the sixth scanning image I6" of the seven scanning images I1"~I7", so that the orientation of the seventh scanning image I7" of the seven scanning images I1"~I7" is the same as the sixth scanning image I6" of the seven scanning images I1"~I7", which makes it easy to read.

In contrast to the prior art, in the preset disclosure, when the control unit determines each time interval between two continuous scanning images of the first scanning image to the Mth scanning image of the N scanning images is less than the predetermined time interval, the control unit can judge that the first scanning images to the Mth scanning image belong to the same scanning task, e.g., a first scanning task, and control the alignment module to align the orientations of the second scanning image to the Mth scanning image with the orientation of the first scanning image, so that the orientations of the second scanning image to the Mth scanning image of the Nth scanning images are the same as the orientation of the first scanning image of the Nth scanning images. Furthermore, when the control unit determines the (M−1)th time interval of the N time intervals between the Mth scanning image and the (M−1)th scanning image of the N scanning images is greater than the predetermined time interval, the control unit considers the Mth scanning image of the N scanning images is an initial scanning image of another new scanning task, e.g., a second scanning task, and does not control the alignment module to align the orientation of the Mth scanning image of the N scanning images with the orientation of the first scanning image of the N scanning images. Besides, when the control unit determines the Mth time interval of the N time intervals between the (M+1)th scanning image and the Mth scanning image of the N scanning images is less than the predetermined time interval, the control unit can judge that the Mth scanning image and the (M+1)th scanning image of the N scanning images belong to the same scanning task, e.g., the second scanning task, and control the alignment module to align the orientation of the (M+1)th scanning image of the N scanning images with the orientation of the Mth scanning image of the N scanning images, so that the orientation of the (M+1)th scanning image of the Nth scanning images is the same as the orientation of the Mth scanning image of the Nth scanning images. M can be greater than 1 and not greater than N. In such a way, the scanning images of the same scanning task can have the same orientation. Therefore, it is not required for a user to manually rotate the misaligned the scanning images anymore, which is convenient in use.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic device for aligning orientations of scanning images, the electronic device comprising:

a scanning module for scanning N scanned objects to generate N scanning images;

a storage module for storing the N scanning images generated by the scanning module;

an identification circuit for identifying orientations of the N scanning images stored in the storage module;

a timing unit for calculating N time intervals among the N scanning images generated by the scanning module;

an alignment circuit for aligning the orientations of the N scanning images stored in the storage module;

a control unit electrically connected to the scanning module, the storage module, the identification circuit, the timing unit and the alignment circuit, the control unit controlling the scanning module to scan the N scanned objects at different times and to store the N scanning images corresponding to the N scanned objects into the storage module, the control unit further controlling the identification circuit to identify the orientations of the N scanning images, and the control unit further determining whether to control the alignment circuit to align orientations of a second scanning image to an Nth scanning image of the N scanning images with an orientation of a first scanning image of the N scanning images according to the N time intervals among the N scanning images calculated by the timing unit.

2. The electronic device of claim 1, wherein the control unit does not control the alignment circuit to align an orientation of an Mth scanning image of the N scanning images with the orientation of the first scanning image of the N scanning images when the control unit determines an (M−1)th time interval of the N time intervals between the Mth scanning image and an (M−1)th scanning image is greater than a predetermined time interval.

3. The electronic device of claim 2, wherein when the control unit determines an Mth time interval of the N time intervals between an (M+1)th scanning image and the Mth scanning image of the N scanning images is less than the predetermined time interval, the control unit controls the alignment circuit to align an orientation of the (M+1)th scanning image with the orientation of the Mth scanning image, so that the orientation of the (M+1)th scanning image of the Nth scanning images is the same as the orientation of the Mth scanning image of the Nth scanning images.

4. The electronic device of claim 1, wherein when the control unit determines each time interval between two continuous scanning images of the first scanning image to an Mth scanning image of the N scanning images is less than a predetermined time interval, the control unit controls the alignment circuit to align the orientations of the second scanning image to the Mth scanning image with the orientation of the first scanning image, so that the orientations of the second scanning image to the Mth scanning image of the Nth scanning images are the same as the orientation of the first scanning image of the Nth scanning images.

5. The electronic device of claim 1, wherein the electronic device further comprises a printing module electrically connected to the control unit and for printing the N scanning images after alignment.

6. The electronic device of claim 1, wherein the identification circuit identifies the orientations of the N scanning images stored in the storage module by optical character recognition.

7. A method of aligning orientations of scanning images with an electronic device, the method comprising:
a control unit of the electronic device controlling a scanning module of the electronic device to scan N scanned objects at different times to generate N scanning images and further storing the N scanning images corresponding to the N scanned objects into a storage module;
the control unit controlling an identification circuit of the electronic device to identify orientations of the N scanning images stored in the storage module;
the control unit controlling a timing unit to calculate N time intervals among the N scanning images; and
the control unit determining whether to control an alignment circuit of the electronic device to align orientations of a second scanning image to an Nth scanning image of the N scanning images with an orientation of a first scanning image of the N scanning images according to the N time intervals among the N scanning images calculated by the timing unit.

8. The method of claim 7, wherein the control unit determining whether to control the alignment circuit of the electronic device to align the orientations of the second scanning image to the Nth scanning image of the N scanning images with the orientation of the first scanning image of the N scanning images according to the N time intervals among the N scanning images calculated by the timing unit comprising:
the control unit not controlling the alignment circuit to align an orientation of an Mth scanning image of the N scanning images with the orientation of the first scanning image of the N scanning images when the control unit determines an (M−1)th time interval of the N time intervals between an Mth scanning image and an (M−1)th scanning image of the N scanning images is greater than a predetermined time interval.

* * * * *